March 23, 1937.  L. W. GAMES  2,074,784
GLASS GOBLET STEM FORMING TOOL
Filed Oct. 29, 1935
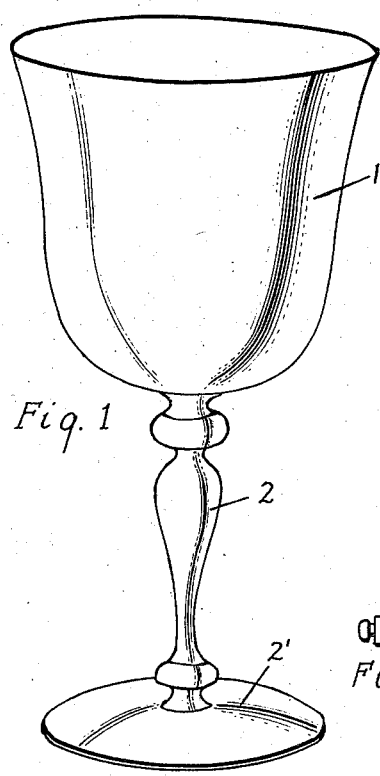
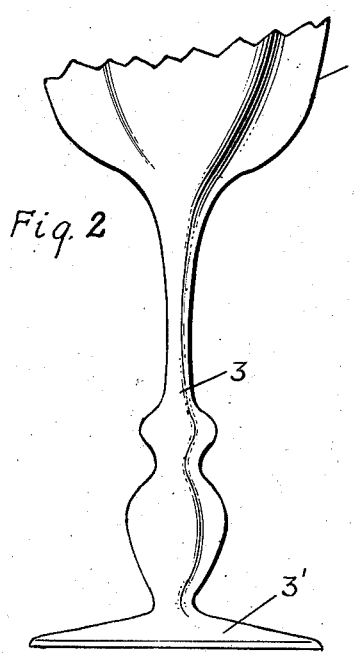
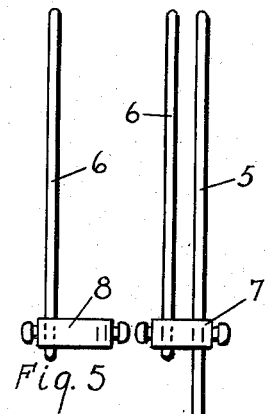
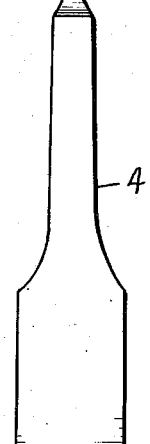
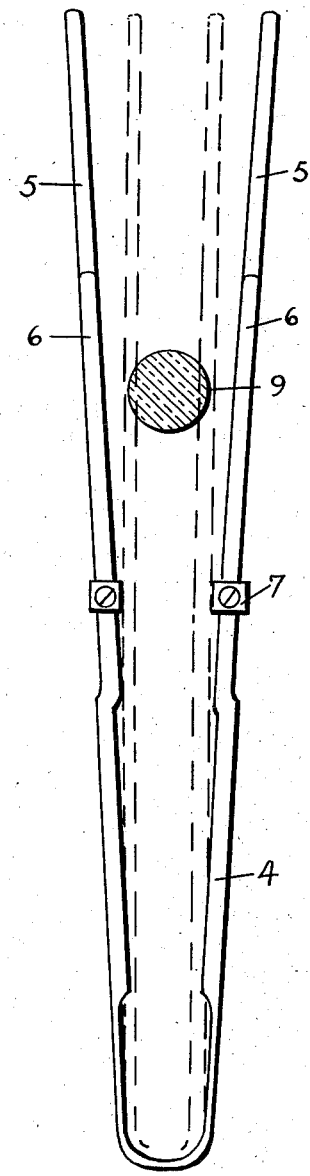
LLOYD W. GAMES
INVENTOR
BY G. H. Duthie
ATTORNEY Patented Mar. 23, 1937

2,074,784

UNITED STATES PATENT OFFICE 2,074,784

GLASS GOBLET STEM FORMING TOOL

Lloyd W. Games, Weston, W. Va.

Application October 29, 1935, Serial No. 47,208

5 Claims. (Cl. 49—24)

This invention relates to new and useful improvements, on a special tool to be used by glass blowers in forming artistic glass goblet stems of different style and size.

The main object of this invention is the construction of a special designed tool, by means of which glass blowers can produce artistic stems of different designs and size on glass goblets as shown and illustrated in Figs. 1 and 2 of the drawing.

A further object is the construction of a special stem forming tool having detachable members or prongs spaced apart by means of which glass goblet stems may be formed in different styles and sizes in a unique artistic manner, with the above and other objects in view which will more fully appear as the description proceeds, it will be observed that my invention consists of certain new novel and combination of parts as fully illustrated, described and claimed. It is to be understood, however, that several changes may be made in the production of said goblet stem forming tool without departing from the spirit and the intent thereof.

I attain these objects by means of the combination and mechanism illustrated in the accompanying drawing in which:—

Figure 1 represents a glass goblet, the stem part of which has been formed with my special tool.

Figure 2 represents a similar glass goblet having a longer and different formed stem which has also been produced by my special stem forming tool.

Figure 3 represents a side view of my stem forming tool.

Figure 4 represents the plan view of my stem forming tool.

Figure 5 represents a detachable prong member, by means of which when placed upon the main prong member, a wider space is produced between said prongs.

Referring to the drawing, similar numerals refer to similar parts throughout the several views.

Numeral 1, designates the glass goblet bowl; numeral 2, designates the artistic goblet stem; 3, designates a longer and different designed goblet stem, as produced by means of my stem forming tool; 4, designates the handle part of said tool; 5, represents the main prongs; 6, detachable prong members; 7, clamping member, attached to the main prongs by means of set screws; 8, a longer clamping member, by means of which when attached to the main prong as shown in the drawing produces a wider space between the prongs; 9, designates a section of a glass stem to which my stem forming tool is applied, and when properly operated by the glass blower, different designed stems are produced as shown in Figures 1 and 2.

It will be observed that by providing different detachable prong members, which when attached to the main prong members, produce different widths of spaces between the main prong and the detachable prong member, different designed stems of different sizes may be produced by the glass blowers operating my tool with the intent to produce certain artistic goblet stems or other glass stem ware of other chosen designs.

Having fully described my stem forming tool, what I claim as new is:—

1. In a stem forming tool for glassware, a pair of stem forming prongs, resilient means supporting said prongs in a substantially parallel relation, a second pair of stem forming prongs, and means supported by said first named pair of stem forming prongs carrying said second named pair of prongs apart from and in a plane substantially parallel with a plane through said first named pair of stem forming prongs.

2. In a stem forming tool for glassware, a pair of stem forming prongs, a second pair of stem forming prongs spaced therefrom and in a plane substantially parallel to a plane through said first named pair of stem forming prongs, and resilient means carrying said pairs of stem forming prongs.

3. In a stem forming tool for glassware, a pair of stem forming prongs, a resilient holding member supporting said prongs in substantially parallel relation, a second pair of stem forming prongs, and means mounted on said first named pair of stem forming prongs to support said second pair of stem forming prongs apart from and in a plane substantially parallel to a plane through said first named pair of stem forming prongs.

4. In a stem forming tool for glassware, a pair of stem forming prongs spaced apart and substantially parallel, spring means connecting said prongs, a second pair of stem forming prongs, a sleeve member on each of said first named pair of prongs, and means on each of said sleeve members to support one of said second named pair of prongs apart from and in a plane substantially parallel to a plane passing through said first named pair of prongs.

5. In a stem forming tool for glassware, a pair of resiliently connected stem forming prongs spaced apart and lying in the same plane, a second pair of stem forming prongs lying in a plane apart from and parallel to said first named plane and means mounted on each of said first named pair of prongs to support one of said second named pair of prongs.

LLOYD W. GAMES.